United States Patent [19]

Van Veldhuizen

[11] 3,767,141
[45] Oct. 23, 1973

[54] AIR CUSHION VEHICLE
[76] Inventor: John Van Veldhuizen, Rt. 1, Estill Springs, Tenn. 37330
[22] Filed: Jan. 26, 1972
[21] Appl. No.: 220,861

Related U.S. Application Data
[62] Division of Ser. No. 873,436, Nov. 3, 1969, Pat. No. 3,652,038.

[52] U.S. Cl............. 244/100 R, 180/119, 244/12 R
[51] Int. Cl............................................... B60v 3/08
[58] Field of Search ..................... 244/100 R, 12 R; 104/23 FS, 119; 105/144; 180/116, 117, 126, 121

[56] References Cited
UNITED STATES PATENTS
3,070,327  12/1962  Dornier et al............... 244/100 R X
3,141,436  7/1964   Cathers et al................... 180/126 X
3,285,541  11/1966  Fehring et al............... 244/102 R X Primary Examiner—Milton Buchler
Assistant Examiner—Paul E. Sauberer
Attorney—Harvey B. Jacobson

[57] ABSTRACT

A vehicle defining a downwardly opening centrally disposed air cushion containing chamber bound along its opposite sides by upstanding longitudinally extending plenum chambers. Opposite side high bypass turbo engine pods are supported outwardly of the plenum chambers and structure is provided for variably bleeding the bypass air from the engine pods directly into the plenum chambers which in turn include lower outlets spaced longitudinally therealong opening at least substantially directly into the air cushion containing chamber.

8 Claims, 4 Drawing Figures

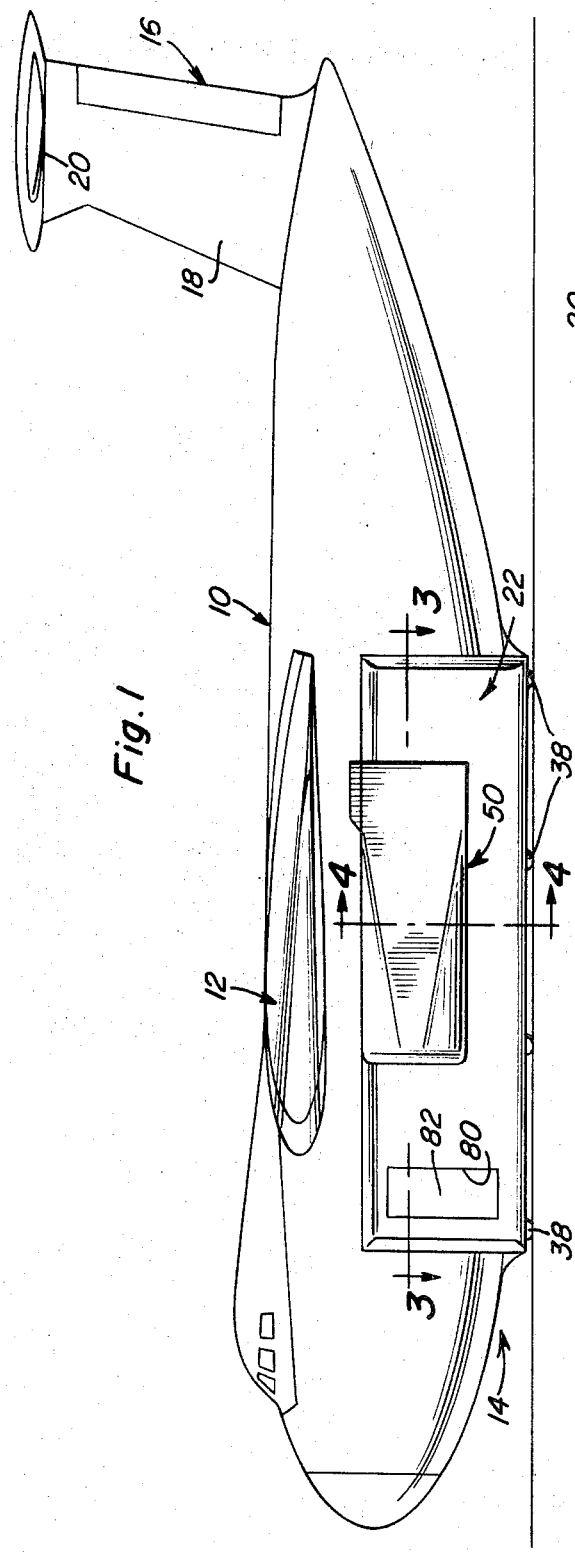
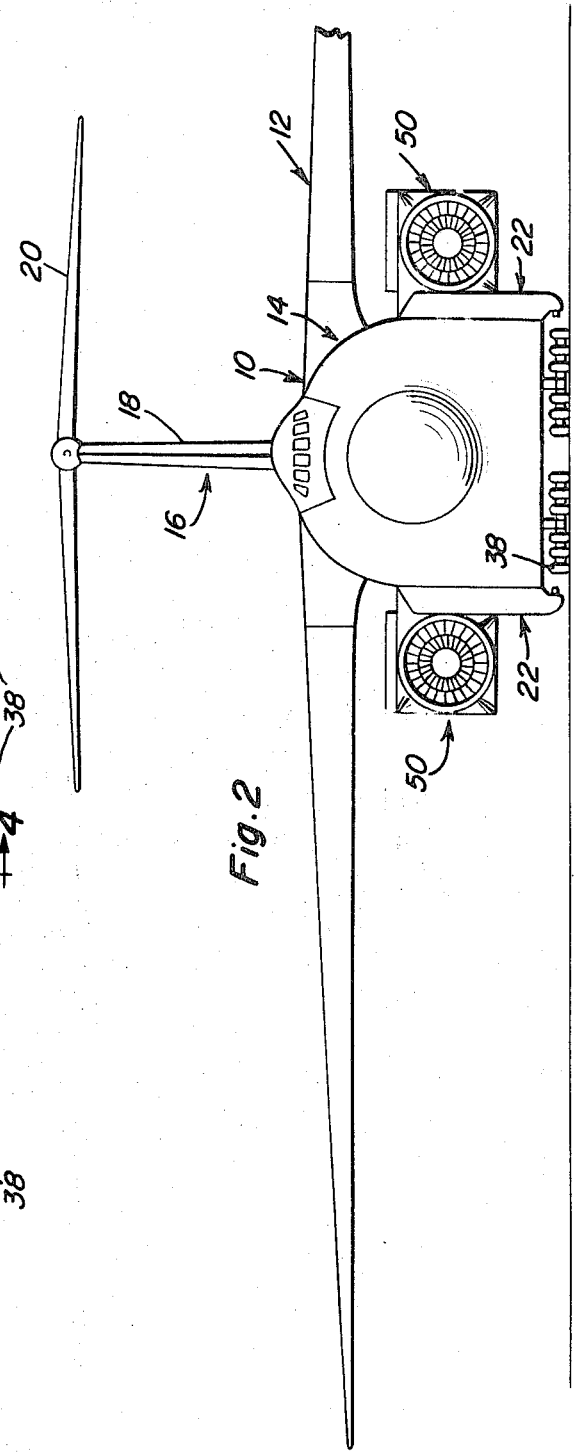

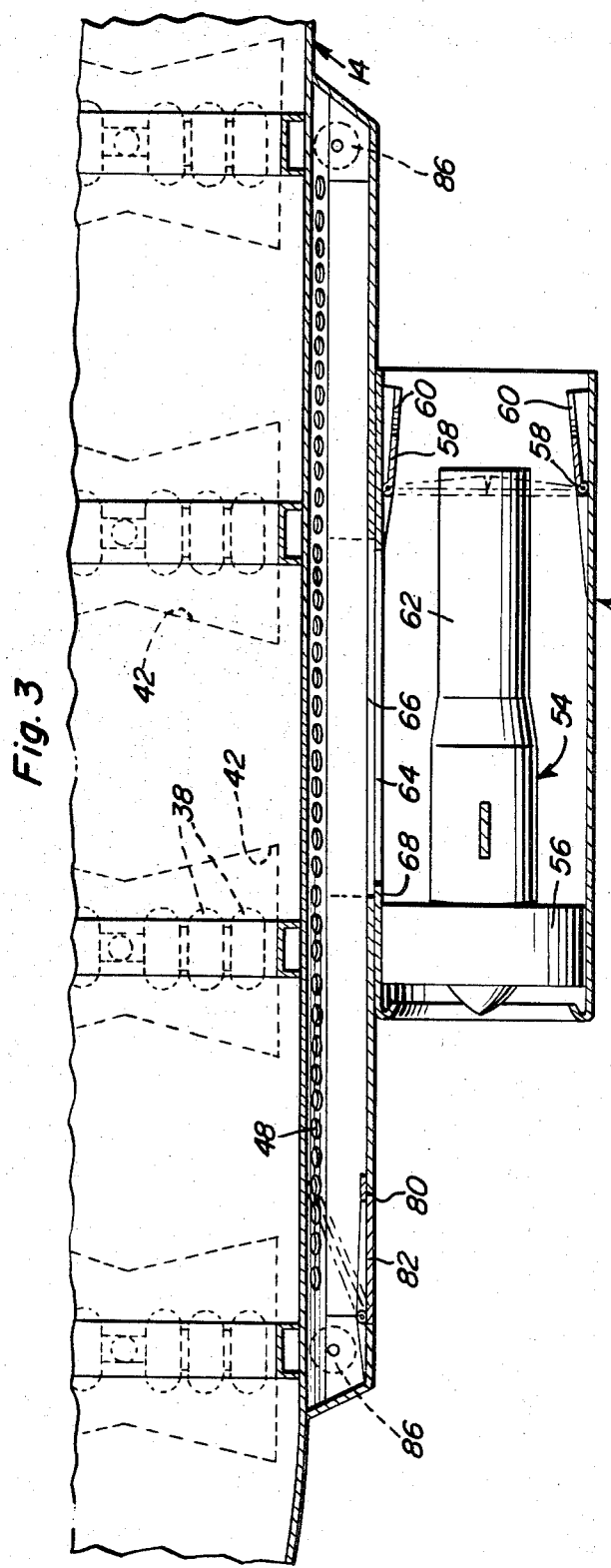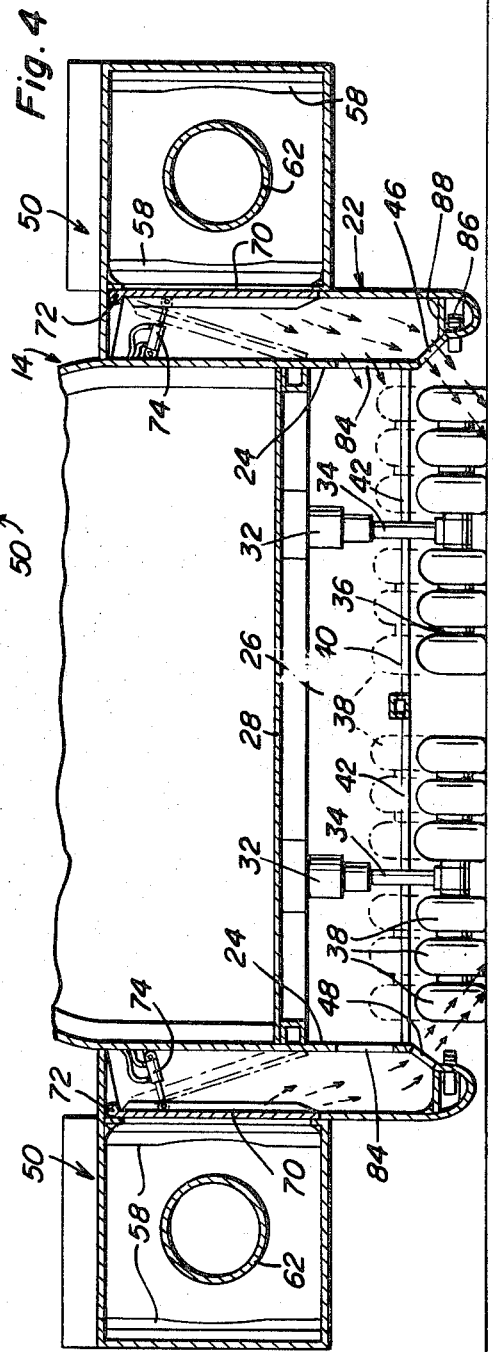

AIR CUSHION VEHICLE

This application comprises a division of my copending U.S. application Ser. No. 873,436, filed Nov. 3, 1969, for "Airplane With Air Cushion Landing Gear", now U.S. Pat. No. 3,652,038.

The vehicle of the instant invention includes an airplane fuselage whose lower central area defines a downwardly opening chamber positioned closely adjacent the ground when the airplane or vehicle is supported from its landing wheels. The chamber includes peripherally spaced air inlet means through which air under pressure may be admitted at high velocity and the vehicle includes a plurality of high bypass turbo fan engines as propulsion units and the bypass air from these engines is ducted almost directly into the inlets for the air cushion chamber. Accordingly, the engines of the vehicle serve the dual function of providing a propulsive force for the vehicle and also as a means for supplying large quantities of air under pressure to the air cushion chamber. Further, the supporting wheels of the vehicle are arranged in a plurality of longitudinally spaced sets of transversely aligned and closely spaced ground engaging wheels whose lower peripheral portions project slightly below the under-surface portions of the fuselage or body of the vehicle and the sets of wheels are disposed in and at least partially divide the interior of the air cushion containing cavity into a plurality of longitudinally spaced cavity segments.

It is the main object of this invention to provide an aircraft with improved landing gear which may function both during take-off and landing as well as taxiing operations and may be utilized to cushion landing shock, reduce rolling friction during take-off and also facilitate tight maneuvering operations when taxiing.

Another object of this invention is to provide an improved air cushion vehicle designed to utilize existing power plants for propulsion and also for supplying compressed air to the air cushion forming structure of the vehicle.

A final object of this invention to be specifically enumerated herein is to provide an air cushion vehicle in accordance with the preceding objects which will conform to conventional forms of manufacture, be of simple construction and easy to operate so as to provide a device that will be economically feasible, durable and readily operable with a minimum of sophisticated controls.

These together with other objects and advantages which will become subsequently apparent reside in the details of construction and operation as more fully hereinafter described and claimed, reference being had to the accompanying drawings forming a part hereof wherein like numerals refer to like parts throughout, and in which:

FIG. 1 is a side elevational view of a vehicle constructed in accordance with the present invention;

FIG. 2 is a fragmentary front elevational view of the vehicle;

FIG. 3 is an enlarged fragmentary horizonal sectional view taken substantially upon a plane indicated by the section line 3—3 of FIG. 1; and FIG. 4 is a fragmentary enlarged transverse vertical sectional view taken substantially upon a plane indicated by the section line 4—4 of FIG. 1.

Referring now more specifically to the drawings, the numeral 10 generally designates a vehicle constructed in accordance with the present invention. The vehicle 10 is in the form of an aircraft including a high wing structure referred to in general by the reference numeral 12, a low swung fuselage assembly referred to in general by the reference numeral 14 and a tail assembly referred to in general by the reference numeral 16 which includes a vertical rudder 18 having a horizontal stabilizer 20 at its upper end.

As can best be seen from a comparison of FIGS. 2 through 4 of the drawings, the fuselage assembly 14 includes a pair of upstanding opposite side and longitudinally extending plenum chambers 22 whose inner walls are defined by the opposite side walls 24 of the fuselage assembly 14. A downwardly opening chamber 26 is defined between the lower peripheral portions of the sides or side walls 24 and is closed at its upper extremity by means of a bottom wall 28 extending between the sides 24. A pair of transversely spaced sets of longitudinally aligned hydraulic cylinders 32 are secured to and disposed from the bottom wall 28. The cylinders 32 include depending piston rod portions 34 on whose lower ends cross axle shafts 36 are mounted. Each of the cross axle shafts 36 has three closely spaced wheels 38 mounted on each of its opposite ends and it is to be noted that the hydraulic cylinders 32 are of the double acting type whereby the axle shafts 36 may be raised and lowered relative to the lower marginal edge portions of the sides 24. In addition, any suitable means (not shown) may be provided for rotating the piston rods 34 whereby the axle shafts 36 may be angularly displaced about vertical axes for steering the wheels 38.

From FIGS. 3 and 4 of the drawings, it will be noted that four axle shafts 36 are provided on each side of the fuselage assembly 14 and the means (not shown) by which the piston rods 34 may be rotated shall be operable to simultaneously rotate the piston rods 34 disposed fore-and-aft of the longitudinal center of the chamber 26 in opposite directions. Also, the means for rotating the piston rods 34 may be further operable to rotate all of the piston rods 34 in the same direction whereby the wheels 38 may be obliquely arranged for landing and take-off in cross winds.

The lower portion of the chamber 26 is separated from the upper portion thereof by means of a horizontal partition 40 also secured between the side walls 24. However, the partition 40 includes openings 42 formed therethrough by which the wheels 36 may be extended to positions below the partition 40 and retracted to positions above the partition 40.

The lower ends of the plenum chambers 22 are rounded as at 44 and the upwardly convergent inner wall portions 46 thereof have a plurality of longitudinally spaced outlet openings 48 formed therein opening inwardly and downwardly into the lower portion of the chamber 26.

A pair of engine pods or housings referred to in general by the reference numerals 50 are supported from the upper portions of the outer walls 52 of the plenum chambers 22 and each of the pods 50 has a high bypass turbo fan engine generally referred to by the reference numeral 54 mounted therein. The high bypass turbo fan engines may be of any desirable type such as the T55 turbo fan engine manufactured by Avco, Lycoming Division. The turbo fan engines 54 include a fan assembly 56 which is front-mounted on the engine 54 and mated to the power turbine thereof through a center shaft. The forward ends of the pods 50 are open as are the rear ends thereof, but the rear ends of the pods 50 include horizontally swingable shutters 58 having semi-circular cutouts 60 formed in their free swinging edge portions. The shutters 60 are swingable by any suitable means (not shown) from the full open positions illustrated in solid lines in FIG. 4 of the drawings to fully closed positions such as those illustrated in phantom lines in FIG. 3 of the drawings with the semi-circular openings or recesses 60 formed in the shutters 58 closely embracing opposite sides of the outlet pipe 62 of the engine 54.

A pair of registered openings 64 and 66 are formed through the inner wall 68 of each pod 50 and the adjacent outer wall 52 of the corresponding plenum chamber 22. Accordingly, when the shutters 58 are closed, the discharge of air from the fan assemblies 56 is ducted directly into the plenum chambers 22 and from the latter through the openings 48 into the opposite side portions of the lower portion of the chamber 26 disposed below the partition 40.

A pair of shutters referred to in general by the reference numeral 70 are hingedly supported from the plenum chambers 22 as at 72 and are swingable between the solid positions thereof illustrated in FIG. 4 of the drawings closing the opening 66 and the phantom line positions thereof illustrated in FIG. 4 of the drawings allowing the free passage of air from the interiors of the pods 50 into the plenum chambers 22. The shutters 70 are actuated by means of double acting fluid motors 74 connected between the sides 24 of the fuselage assembly 14 and the shutters 70.

The lowermost positions of the wheels 38 illustrated in FIG. 4 of the drawings are the positions assumed by the wheels when the hydraulic cylinders 32 are fully extended. The wheels 38 are positioned in this manner when the aircraft 10 is being taxied. Further, when the hydraulic cylinders 32 are actuated to raise the wheels 38 so that their lower peripheral portions are generally horizontally aligned with the partition 40, the wheels 38 are in the positions thereof which are assumed during flight of the aircraft 10. Further, when the wheels 38 are positioned half-way between their uppermost and lowermost positions with the lower peripheral portions of the wheels 38 projecting only slightly beneath the lower extremities of the plenum chambers 22, the wheels 38 are positioned as they will be when the air cushion formed in the lower extremity of the chamber 26 is operative. In this intermediate position of the wheels 38, the aircraft 10 may taxi and be at least partially supported by the air cushion formed in the lower extremity of the chamber 26 below the partition 40. In addition, this intermediate position of the wheels 38 may also be maintained during take-off of the aircraft 10 whereby the air cushion being formed will be spaced closely adjacent the ground and will be more effective to reduce the amount of weight of the aircraft 10 supported from the wheels 38 during take-off of the aircraft 10. Also, the wheels 38 are positioned in their intermediate positions during tight maneuvering of the aircraft 10 on the ground during taxiing so as to reduce the amount of weight supported by the wheels 38.

It is believed readily apparent that the bypass air being formed by the fan assemblies 56 may be partially throttled or fully throttled so as to be partially or fully ducted into the plenum chambers 22. Further, the shutters 58 may be fully opened and the shutters 70 may be fully closed whereby no air will be ducted into the plenum chambers 22.

Further, in order to assist in braking and maneuvering on the ground, the forward end portions of the outer walls 52 include outlet openings 80 with which pivotally supported control flaps 82 are operatively associated. The flaps 82 are independently controllable by any suitable power means and may be opened to retard foward movement of the aircraft 10 or to assist in ground maneuvering of the aircraft.

It may further be seen from the drawings that the opposite side walls 24 of the fuselage assembly 14 include openings 84 directly communicating the chamber 26 with the interior of the plenum chambers 22. The openings 84 are disposed above the partition 40 in which the openings 42 are formed and serve to admit air under pressure into the area immediately beneath the partition 40 by way of the chamber 26 through the openings 42. Further, the lower extremities of the plenum chambers 22 are provided with longitudinally spaced rollers 86 journaled for rotation about vertical axes and including inner peripheral portions which project into the area beneath the partition 40 between the plenum chambers 22. The lower extremities of the plenum chambers 22 in which the rollers 86 are journaled are sealed from the portions of the plenum chambers 22 disposed thereabove by means of partitions 88.

Inasmuch as the various sets of supporting wheels disposed within the openings 42 divide the interior of the lower portion or extremity of the chamber 26 below the partition 40 into a plurality of longitudinally spaced cavity or chamber segments, more stable support of the vehicle in a slightly elevated position above a ground surface by means of an air cushion formed in the cavity is assured. Further, it is also envisioned that the vehicle may be utilized in conjunction with a monorail snugly receivable between the lower extremities of the plenum chambers 22 with the rollers 86 positioned for rolling engagement with the opposite side surfaces of such a monorail (not shown) for guiding movement of the vehicle therealong.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An elongated vehicle body defining a downwardly opening centrally disposed air cushion containing cavity bound along opposite sides by longitudinally extending plenum chambers a pair of engine pods supported adjacent and outwardly of said plenum chambers, propulsion engines mounted in said engine pods and including driven high capacity air compressing components, means operable to variably bleed compressed air from said pods substantially directly into said plenum chambers, and means operable to substantially directly discharge air from said plenum chambers into said air cushion containing cavity, said vehicle body including a plurality of longitudinally spaced sets of transversely aligned and closely spaced ground engaging wheels whose lower peripheral portions project slightly below the under-surface portions of said body, said sets of wheels being disposed in and at least partially dividing the interior of said cavity into a plurality of longitudinally spaced cavity segments.

2. The combination of claim 1 including means supporting said sets of wheels for vertical shifting relative to said vehicle body between limit positions with the lower peripheral portions of said wheels spaced above and below a horizontal plane containing the lower extremities of said plenum chambers.

3. The combination of claim 1 wherein said body includes longitudinally spaced rollers journaled for rotation about upstanding axes supported from said body along opposite sides of said cavity and including inner peripheral edge portions projecting into lower opposite side portions of said cavity said rollers being adapted for rolling engagement with the opposite side surfaces of a monorail upon which said body is lengthwise disposed.

4. The combination of claim 1 wherein said vehicle body comprises an aircraft fuselage.

5. The combination of claim 4 wherein said fuselage includes opposite side generally horizontally outwardly projecting wing segments spaced above said plenum chambers.

6. An elongated vehicle body defining a downwardly opening centrally disposed air cushion containing cavity, means carried by said vehicle for discharging compressed air into said cavity, said vehicle body including a plurality of longitudinally spaced sets of transversely aligned and closely spaced ground engaging wheels whose lower peripheral portions project slightly below the under surface portions of said body, said sets of wheels being disposed in and at least partially dividing the interior of said cavity into a plurality of longitudinally spaced cavity segments beneath which at least partially separate air cushions may be formed by the compressed air discharged into said cavity segments.

7. The combination of claim 6 including means supporting said wheels for vertical shifting relative to said vehicle body between limit positions with the lower peripheral portions of said wheels spaced above and below a horizontal plane containing the lower extremities of said body.

8. The combination of claim 6 wherein said vehicle body includes parallel downwardly projecting lower opposite side portions, said opposite side portions including longitudinally spaced rollers journalled for rotation about upstanding axes and including inner peripheral portions projecting into said cavity.

* * * * *